(12) United States Patent
Schenk

(10) Patent No.: US 7,300,094 B2
(45) Date of Patent: Nov. 27, 2007

(54) HARDTOP CONVERTIBLE VEHICLE

(75) Inventor: Bernhard Schenk, Boeblingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/563,335

(22) PCT Filed: Jun. 26, 2004

(86) PCT No.: PCT/EP2004/006951

§ 371 (c)(1),
(2), (4) Date: Jun. 27, 2006

(87) PCT Pub. No.: WO2005/002895

PCT Pub. Date: Jan. 13, 2005

(65) Prior Publication Data

US 2006/0244285 A1 Nov. 2, 2006

(30) Foreign Application Priority Data

Jul. 1, 2003 (DE) ............................... 103 29 439

(51) Int. Cl.
*B60J 7/14* (2006.01)

(52) U.S. Cl. ............ 296/108; 296/107.07; 296/107.08; 296/107.17

(58) Field of Classification Search ................ 296/108, 296/116, 107.07, 107.08, 107.15, 107.16, 296/107.17, 107.18
See application file for complete search history.

(56) References Cited

U.S. PATENT DOCUMENTS

| 5,520,432 | A | * | 5/1996 | Gmeiner et al. ....... 296/107.01 |
| 6,131,988 | A | * | 10/2000 | Queveau et al. ....... 296/107.17 |
| 6,419,295 | B1 | * | 7/2002 | Neubrand .............. 296/107.07 |
| 6,585,310 | B1 | | 7/2003 | Guillez et al. |
| 2001/0042992 | A1 | | 11/2001 | Obendiek |
| 2003/0184116 | A1 | | 10/2003 | Guillez et al. |
| 2003/0189356 | A1 | | 10/2003 | Hasselgruber et al. |
| 2003/0201658 | A1 | | 10/2003 | Obendiek et al. |
| 2004/0041436 | A1 | * | 3/2004 | Guillez et al. .............. 296/108 |

(Continued)

FOREIGN PATENT DOCUMENTS

DE 93 07 481.6 5/1993

(Continued)

*Primary Examiner*—Jason S Morrow
(74) *Attorney, Agent, or Firm*—Crowell & Moring LLP

(57) ABSTRACT

A hardtop convertible vehicle has a front roof part, a central roof part and a rear roof part that includes C-pillars and a rear window. The roof parts are connected to one another in an articulated manner and are movable between a closed roof position and an open roof position by means of a displacing device. In the open roof position, the roof parts are located in a trunk of the vehicle, with the rear roof part and the central roof part lying one above the other. The rear window of the rear roof part is mounted in an articulated manner in relation to the C-pillars of the rear roof part such that it is pivoted in relation to the C-pillars during the movement of the roof parts between the closed roof position and the open roof position and assumes a position with its curvature in the same direction as the central roof part. In the open roof position, the front roof part lies outside the rear roof part and the central roof part, either along a backrest or along a motor vehicle tank.

4 Claims, 1 Drawing Sheet

U.S. PATENT DOCUMENTS

2005/0104412 A1* 5/2005 Perakis .................. 296/107.18
2006/0273618 A1* 12/2006 Queveau et al. ............ 296/108
2007/0132271 A1* 6/2007 Brockhoff et al. ..... 296/107.08

FOREIGN PATENT DOCUMENTS

| | | |
|---|---|---|
| DE | 196 42 153 A1 | 10/1996 |
| DE | 197 51 600 C1 | 11/1997 |
| DE | 198 07 490 C1 | 2/1998 |
| DE | 199 62 070 A1 | 12/1999 |
| DE | 101 16 709 A1 | 4/2001 |
| DE | 101 33 957 A1 | 7/2001 |
| DE | 102 13 836 A1 | 3/2002 |
| EP | 0 835 780 A1 | 4/1998 |
| WO | WO 00/73096 A1 | 12/2000 |

* cited by examiner

HARDTOP CONVERTIBLE VEHICLE

BACKGROUND AND SUMMARY OF THE INVENTION

This application claims the priority of German patent document 103 29 439.2, filed Jul. 1, 2003 (PCT International Application No. PCT/EP2004/006951, filed Jun. 26, 2004), the disclosure of which is expressly incorporated by reference herein.

The present invention relates to a hardtop convertible vehicle.

A convertible of the generic type with a hardtop which has three roof parts, is disclosed for example in German patent document DE 101 33 957 A1. In the open roof (top down) position, the front roof part is stowed in the trunk of the vehicle, between the central and the rear roof parts. The front roof part is raised over the central roof part by means of a corresponding lever arrangement during a stowing movement.

German patent document DE 199 62 070 A1 discloses a similar arrangement, in which the front roof part is likewise raised over the central roof part. However, in the stowed state, the front roof part lies at the top.

German patent document DE 196 42 153 A1, on the other hand, describes a motor vehicle with a retractable roof which also has three roof parts. In this case, the front roof part is folded in an articulated manner and is stowed in the trunk between the central roof part and the rear roof part. A similar folding-in of the front roof part is also described in German patent document DE 93 07 481 U1, but with the front roof part coming to lie right at the bottom.

German patent document DE 197 51 660 C1 discloses a device for stowing the roof construction of a hardtop vehicle, which includes a front roof part and a rear roof part. The rear roof part has a rear window that is pivoted relative to the rear roof part by means of a lever and a joint during the stowing movement of the two roof parts and is stowed in an opposed direction to the rear roof part. Rotation of the rear window in such a manner is also known from German patent document DE 198 07 490 C1. However, in the latter case, the rear window is merely rotated through an angle of approx. 15° and is therefore stowed essentially in the same direction as the rear roof part.

Finally, German patent document DE 101 16 709 A1 also discloses the movement of a rear window in relation to the rear roof part. However, in this case the rear roof part has an additional roof segment which likewise has to be pivoted, so that a very complicated construction and a correspondingly complicated stowing movement are required.

In all of the described roof systems with three roof parts, there is the fundamental problem that, in the open (top down) roof position, in which all of the roof parts are located in the trunk, the volume of space available in the trunk is substantially restricted.

It is therefore an object of the present invention to provide a convertible vehicle with a hardtop with at least three roof parts, in which the hardtop requires as little space as possible when stowed in the trunk.

This and other objects and advantages are achieved by the convertible top configuration according to the invention, in which the rear window is articulated in relation to the C-pillars. The resultant pivoting of the same, causes the rear window to assume a position in which it lies with its curvature in the same direction as that of the central roof part, achieving a considerable saving of space in the region between the C-pillars of the rear roof part. Thus, substantially more space is available for luggage when the roof is in the open (top down) position.

The volume of available trunk space in the open roof position is further increased by the fact that the front roof part is stowed in a very efficient manner, either along a backrest or along a motor vehicle tank, rather than with the rear and the central roof parts one above another. The result is therefore a convertible which provides its passengers with sufficient luggage space, even in the open state of the roof.

A particular advantage of the invention can be seen in its comparatively simple construction with a correspondingly uncomplicated configuration of the components.

Other objects, advantages and novel features of the present invention will become apparent from the following detailed description of the invention when considered in conjunction with the accompanying drawings.

DETAILED DESCRIPTION OF THE INVENTION

Figure 1:
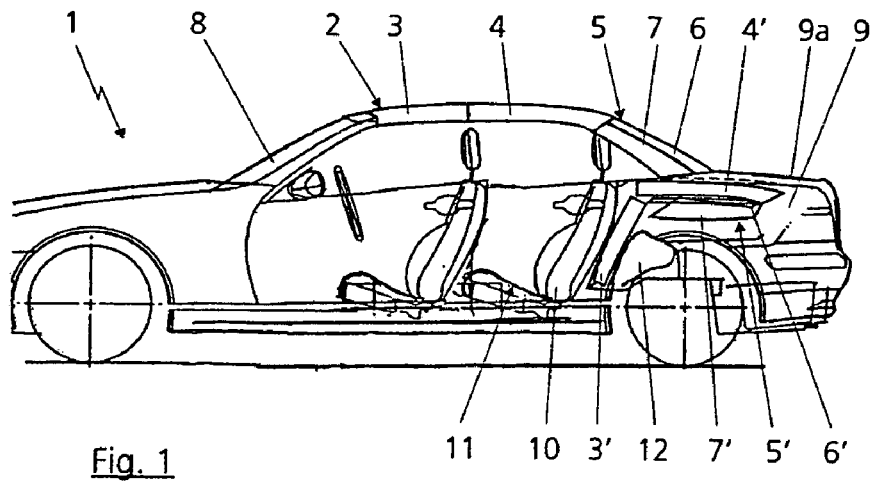
FIG. 1 shows a first embodiment of the hardtop convertible according to the invention.

FIG. 1 shows a convertible 1 with a hardtop 2 which has three roof parts, including a front roof part 3, a central roof part 4 and a rear roof part 5. In this case, the rear roof part 5 comprises a rear window 6 and two C-pillars 7 of which just one can be seen in the side view of FIG. 1.

The hardtop 2 is illustrated in two positions in FIG. 1, namely in a closed roof position, in which the hardtop 2 and the roof parts 3, 4 and 5 extend from a windshield 8 to a trunk 9 which has a trunk lid 9a. The second position is assumed when the roof parts 3', 4' and 5' (designated by a "prime" mark) are located in the trunk 9, in the open roof (top down) position.

The roof parts 3, 4 and 5 are connected to one another in an articulated manner, and thus movement between the closed roof position and the open roof position is performed by a displacing device which is not illustrated but is known per se. In the open roof position, the rear roof part 5' and the central roof part 4' come to lie one above the other, with the rear roof part 5' being arranged below the central roof part 4' in the present case.

The rear window 6 is mounted in an articulated manner in relation to the C-pillars, such that it is pivoted in relation to the C-pillars 7 during movement of the roof parts 3, 4 and 5 and, as indicated by the position of the rear window 6', comes to lie with its curvature in the same direction as the central roof part 4'. As a result, only the C-pillars 7' of the rear roof part 5' are located in a lower position. However, due to the position of the C-pillars 7' on the two sides of the trunk 9, only a very small amount of space is taken up within the trunk 9.

In order to be able to load as much luggage as possible into the trunk 9, in the embodiment according to FIG. 1, the front roof part 3' moves to a position along a backrest 10 of a rear seat bench 11 of the convertible 1, outside the arrangement of the rear roof part 5' with the central roof part 4'. The front roof part 3' is therefore located between the backrest 10 and a motor vehicle tank 12. Of course, the motor vehicle tank 12 may also be located at a different point within the convertible 1.

Figure 2:
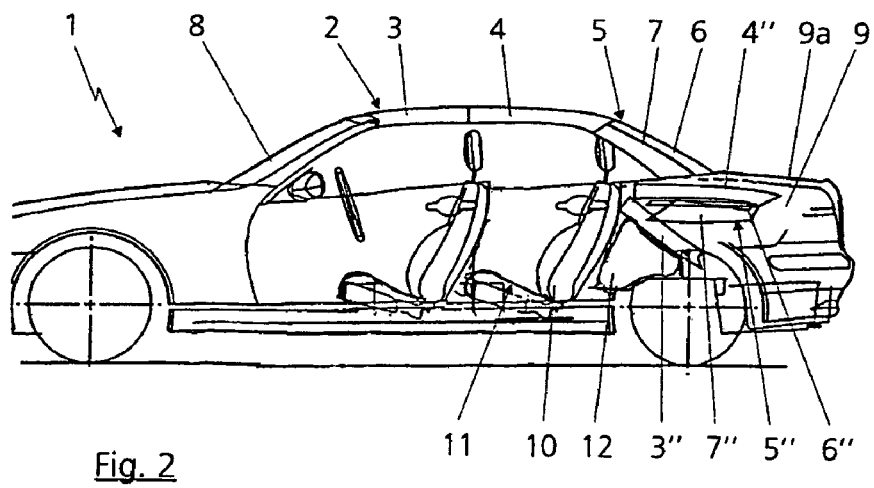
FIG. 2 shows a second embodiment of the hardtop convertible according to the invention.

The embodiment of the hardtop 2 according to FIG. 2 is similar to that of FIG. 1, with the open roof position being indicated by a double prime mark Thus, the rear roof part 5", the central roof part 4", the rear window 6" and the C-pillars 7" are located in the same position as in the case of FIG. 1. The front roof part 3" again assumes a position outside the arrangement of the rear roof part 5" with the central roof part 4", but in this embodiment it lies along the motor vehicle tank 12 and behind the same in the direction of travel. The shape of the motor vehicle tank 12 can be matched to the shape of the front roof part 3 in order to achieve a volume of the motor vehicle tank 12 which is as large as possible.

The displacing apparatus can have a plurality of rotary drives which are arranged in each case on the articulated connections between the roof parts 3, 4 and 5. This assists the exact stowing of the front roof part 3 into the intermediate space between the backrest 10 and the motor vehicle tank 12 in the case of FIG. 1 or along the motor vehicle tank 12 in the case of FIG. 2.

As an alternative, the displacing apparatus can have a driving device, such as, for example, an electric motor or a plurality of hydraulic cylinders, with the roof parts 3, 4 and 5 connected to one another via respective lever arrangements (not illustrated).

The two embodiments according to FIGS. 1 and 2 illustrate different vehicles 1. That is, for reasons of saving space, it is not anticipated to allow the driver of the convertible 1 to select whether he would like to stow the front roof part 3 along the backrest 10 or along the motor vehicle tank 12 when opening the hardtop 2.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A hardtop convertible vehicle, comprising:
   a front roof part;
   a central roof part; and
   a rear roof part, which includes C-pillars and a rear window; wherein,
   the roof parts are connected to one another in an articulated manner and are movable between a closed roof position and an open roof position by means of a displacing device;
   in the open roof position, the roof parts are located in a trunk of the vehicle, with the rear roof part and the central roof part lying one above the other;
   the rear window of the rear roof part is mounted in an articulated manner in relation to the C-pillars of the rear roof part, such that, during movement of the roof parts between the closed roof position and the open roof position, it is pivoted in relation to the C-pillars and moves to a position with its curvature oriented in the same direction as the central roof part;
   in the open roof position, the front roof part assumes a position within the trunk which is one of i) between a backrest of a rear vehicle seat and a vehicle fuel tank, and ii) along the vehicle fuel tank and behind the same relative to a forward direction of travel.

2. The vehicle as claimed in claim 1, wherein:
   the displacing device has a driving device; and
   the roof parts are connected to one another via respective lever arrangements.

3. A method of operating a convertible top of a convertible vehicle having a hardtop comprising a front roof part, a central roof part and a rear roof part that includes C-pillars and a rear window, said method comprising:
   moving said vehicle top from a closed position, in which it encloses a passenger compartment of said vehicle, into an open position, in which said passenger compartment is open to the exterior; and
   in said open position, storing said vehicle top in a trunk space at the rear of said vehicle; wherein,
   during movement of said top between the closed position and the open position, i) the rear window is pivoted relative to the C-pillars and moves to a position with its curvature oriented in the same direction as the central roof part, ii) the front roof part is moved into a position in said trunk space which position is one of i) between a backrest of a rear vehicle seat and a vehicle fuel tank, and ii) along the vehicle fuel tank and behind the same relative to a forward direction of travel.

4. A method of storing a convertible vehicle top of a convertible vehicle having a hardtop comprising a front roof part, a central roof part, and a rear roof part that includes a rear window, said method comprising:
   storing said central roof part and said window of said rear roof part in a trunk of said vehicle, with said window being nested with said central roof part one above the other, with its curvature oriented congruent with the central roof part; and
   storing said front roof part at a location in said trunk that is one of i) between a backrest of a rear vehicle seat and a vehicle fuel tank, and ii) along the vehicle fuel tank and behind the same relative to a forward direction of travel.

* * * * *